United States Patent [19]

Rittmann

[11] 4,418,796

[45] Dec. 6, 1983

[54] TRANSMISSION AND DISC BRAKE

[75] Inventor: Udo Rittmann, Mulheim, Fed. Rep. of Germany

[73] Assignee: Clark Equipment Company, Buchanan, Mich.

[21] Appl. No.: 7,483

[22] Filed: Jan. 29, 1979

[51] Int. Cl.³ ............................................. F16D 55/36
[52] U.S. Cl. ..................... 188/71.5; 180/6.5; 188/71.7; 188/106 F; 188/196 M; 192/70.25; 192/111 R
[58] Field of Search ................... 188/71.3, 71.5, 71.7, 188/106 F, 196 M, 196 RA, 196 D, 196 F; 180/6.5, 6.48; 192/70.25, 111 R, 111 B, 70

[56] References Cited

U.S. PATENT DOCUMENTS

| | | |
|---|---|---|
| 2,159,326 | 5/1939 | Harwood et al. |
| 2,221,014 | 11/1940 | Williamson .............. 192/111 TS X |
| 2,826,274 | 3/1958 | Albright . |
| 2,874,807 | 2/1959 | Hahn . |
| 2,946,408 | 7/1960 | Peras ............................ 188/106 F |
| 3,008,547 | 11/1961 | Rockwell ...................... 188/71.5 |
| 3,237,724 | 3/1966 | Kershner et al. ................. 188/71.5 |
| 3,376,990 | 4/1968 | Latall . |
| 3,410,373 | 11/1968 | Pace ............................. 188/196 F |
| 3,424,279 | 1/1969 | Frigger ............................. 188/71.3 |
| 3,980,347 | 9/1976 | Griesenbrock . |
| 4,124,084 | 11/1978 | Albright et al. ................. 180/6.48 |

FOREIGN PATENT DOCUMENTS

| | | | |
|---|---|---|---|
| 2720236 | 11/1977 | Fed. Rep. of Germany ..... 188/71.3 |
| 728376 | 4/1955 | United Kingdom .............. 188/71.7 |

OTHER PUBLICATIONS

Yale Sit-Down Rider Electric Trucks, K58C Series, Eaton Corporation, Industrial Truck Division, 2-1977.

Primary Examiner—George E. A. Halvosa
Attorney, Agent, or Firm—John C. Wiessler; Marmaduke A. Hobbs

[57] ABSTRACT

A brake system for a vehicle in which a pair of brake discs are mounted on two opposed shafts in alignment with one another and pucks are disposed on opposite sides of each of said discs. The pucks between the discs are supported by relatively movable support members, and an adjustment device is disposed between the support members to vary the spacing between the pucks and discs to compensate for wear occurring in the pucks from braking operations. The brakes are operated by a hydraulic actuator which presses the pucks onto the respective discs and urges them toward an abutment, the abutment being either a fixed member or the head of a mechanical brake which can apply a braking force in the direction opposite to the hydraulic actuator, to apply the brakes.

8 Claims, 5 Drawing Figures

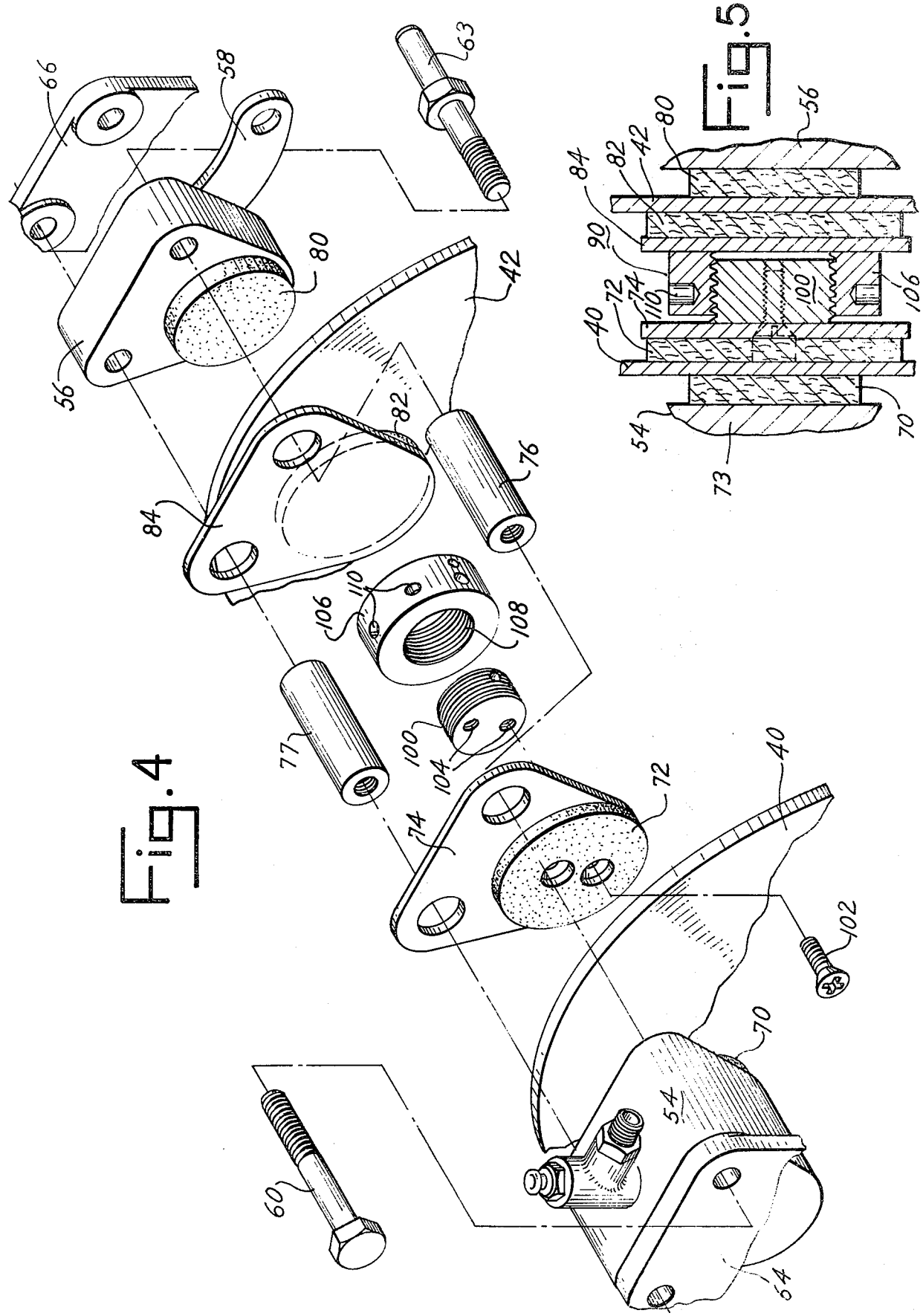

TRANSMISSION AND DISC BRAKE

Rigid axle housings and independent differentially driven wheels are used extensively in industrial vehicles such as fork lift trucks and the like. In a typical design for fork lift trucks, the two drive wheels are mounted on independent axles, each of which is driven by a separate motor. This broad concept, utilizing independent differentially driven drive wheels, provides for more positive traction between the drive wheel and the surface upon which it travels. Greater torque is available for operation under load, and increased speed may be generated for longer travel. Braking on the typical vehicle having independent differentially driven wheels is accomplished by drum or disc brake mechanisms which are independently positioned, one for each drive wheel, but which are jointly activated. Thus, in the usual prior art embodiment, separate braking units are positioned either at the wheel, or inboard for each drive wheel, and are simultaneously activated upon the vehicle operator's use of a braking pedal or lever. This typical braking design requires maintenance of two separate braking units. Adjustments or replacement of worn parts must be performed on each, substantially increasing the time and cost involved in servicing the systems. Hand or parking brake systems must be designed so as to operate on each brake drum or disc. Back-up or fail-safe systems, such as that described in U.S. Pat. No. 3,980,347 issued to Karl-Heinz Griesenbrock, are necessarily complex to provide back-up systems on each brake. Uneven braking can result if the individual units are not properly adjusted, or fail to be activated simultaneously. This uneven braking can cause the vehicle to drive in the direction of, and partially pivot around, the more positively braked wheel. In a crowded warehouse where maneuvering room is minimal, a sudden deviation from the expected movement, even if slight, can cause the loaded fork-lift to ram nearby stacks, causing them to fall and become damaged, or even injure nearby workers. It is therefore one of the principal objects of the present invention to provide a single braking mechanism in which both shafts of an independent differentially driven pair of shafts are braked simultaneously by one braking actuator, thereby minimizing the risk of uneven braking and its potentially hazardous results, and which is easily and readily adjusted and will substantially decrease the time necessary to make such adjustments, as well as substantially minimizing the risk of misadjustment.

Another object of the present invention is to provide an adjustable, simultaneously braking mechanism for independently driven shafts, which is simple in construction and operation, and may incorporate both mechanical and hydraulic actuating devices, and which is compact and can be incorporated in limited space in the brake mechanism.

A still further object of the present invention is to provide an adjustment mechanism for a simultaneous braking assembly, which is readily accessible and can be conveniently and effectively adjusted and easily serviced and repaired by replacement of worn parts if required, and in which dual disc brakes of the assembly can be precisely and reliably adjusted by the manipulation of a single adjustment means.

Further objects and advantages of the present invention will become apparent from the following description and accompanying drawings, wherein:

FIG. 4 is an exploded perspective view of the adjustable simultaneous braking mechanism for indpendently driven shafts of FIGS. 1 through 3; and FIG. 5 is an enlarged cross sectional view of the adjustment mechanism of the brake assembly shown in the preceding figures, the section being taken at line 5—5 of FIG. 3.

Figure 1:
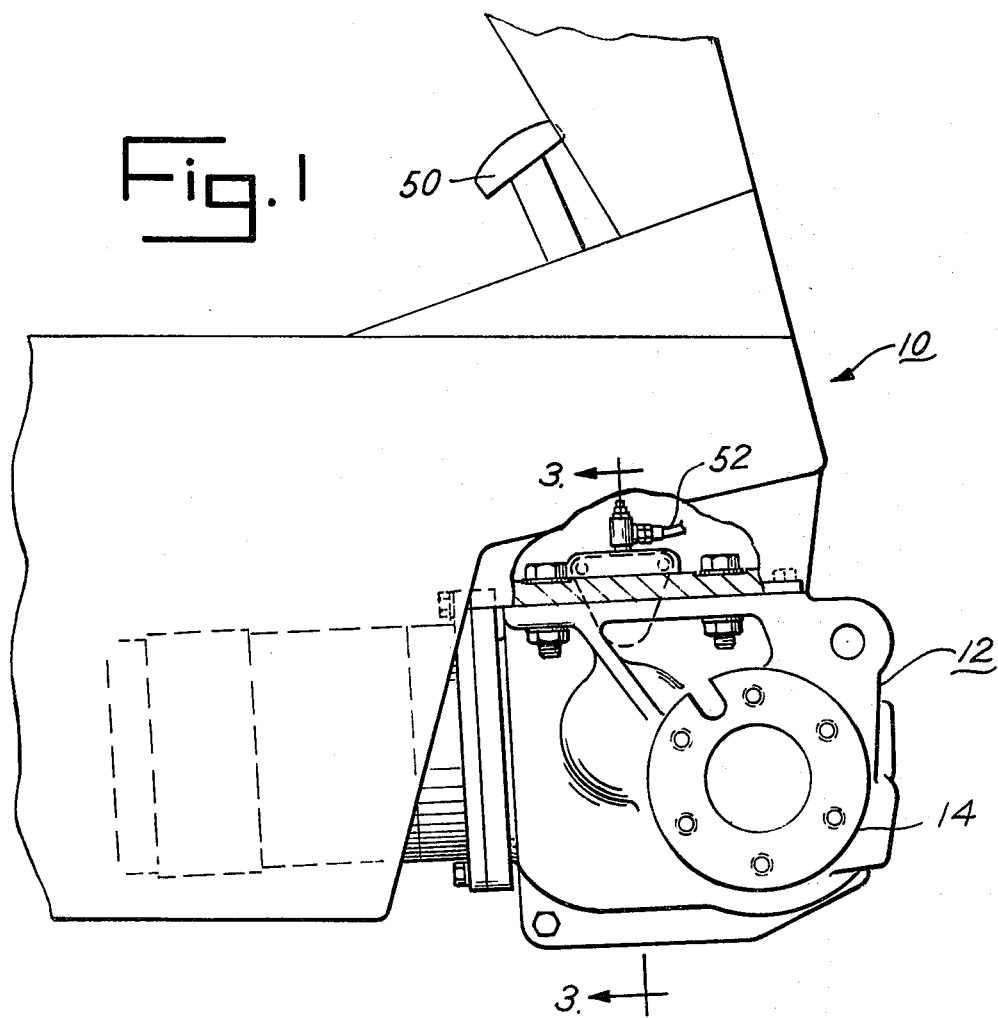
FIG. 1 is an end elevational view of the front end of a fork lift truck in which a portion is broken away to reveal the hub and rigid axle housing.
Figure 2:
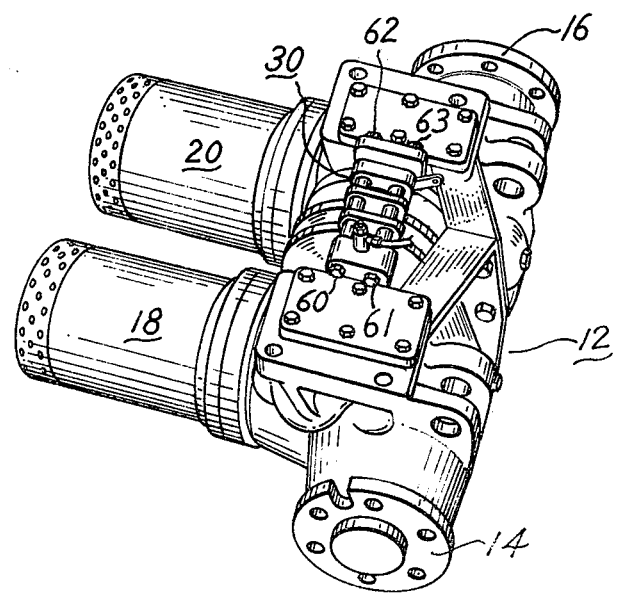
FIG. 2 is a perspective view of the rigid axle housing and independent drive motors.

Referring more specifically to the drawings, and to FIG. 1 in particular, numeral 10 indicates generally the front end of a lift truck, with the wheels removed from the hubs of the axle housing generally indicated by the numeral 12. The main drive wheels are mounted on hubs 14 and 16 of axle 12 and are driven by motors 18 and 20 through independent transmissions and axles in housing 12. The details of the transmissions for each of the wheels are well known and will not be described in detail herein, except as required to illustrate the present braking mechanism. A drive assembly somewhat similar in basic structure and operation to the present drive assembly is disclosed in U.S. Pat. No. 3,376,990 issued to R. C. Latall, dated Apr. 9, 1968. While a lift truck is used herein to illustrate the present invention, the braking mechanism may be used with other types of vehicles.

The brake mechanism, indicated generally by numeral 30, is connected to stub shafts 32 and 34 for the right and left hubs 14 and 16 of axle 12. The two stub shafts are journaled in bearings 36 and 38, which in turn are mounted in the wall of axle housing 12. The lift truck is driven by the two wheels on hubs 14 and 16, and is steered by the rear wheel or wheels of the truck. The brake mechanism 30 includes two brake discs 40 and 42 mounted, respectively, on shafts 32 and 34 by splines 44 and 46 to permit the discs to move axially on said shafts 32 and 34 when the brakes are applied. Thus, the two discs rotate in unison with the two stub shafts, and since the two stub shafts are connected by the gear train of the transmission to the axles for the respective hubs 14 and 16, the two discs directly and positively control the wheels on the hubs. The discs are controlled by the operator through brake pedal 50 and a hydraulic system including a line 52 and a brake actuator 54, or they may be controlled mechanically by a head 56 through a lever 58 connected by a linkage to a hand brake. The hydraulic actuator 54 is rigidly supported by a pair of bolts 60 and 61, and head 56 is slidably supported on a pair of bolts 62 and 63, bolts 60 and 61 being rigidly connected to a bracket 64, and bolts 62 and 63 being rigidly connected to bracket 66. The two brackets are rigid and preferably formed integrally with the axle housing.

Figure 3:
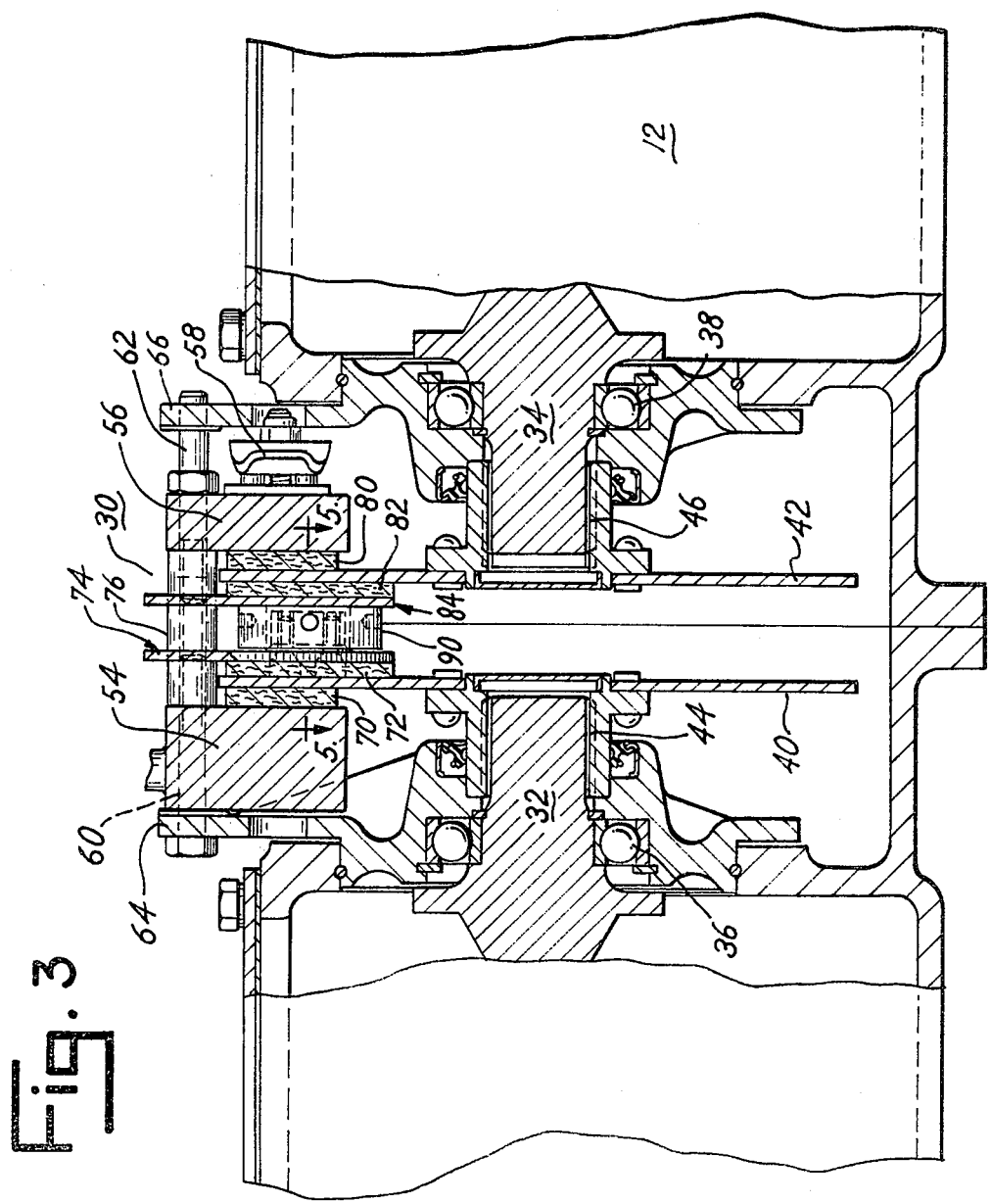
FIG. 3 is an enlarged partial cross sectional view of the rigid axle housing shown in FIG. 1, the cross section being taken at line 3—3 of FIG. 1, and showing the details of the adjustable simultaneous braking mechanism.

Disc 40 is controlled by a pair of pucks 70 and 72, puck 70 being mounted on the outer end of a piston 73 in actuator 54 and movable axially with respect to the brake. Puck 72 is mounted on a support plate 74, which in turn is mounted on sleeves 76 and 77 connected at opposite ends to bolts 60, 61 and 62, 63, respectively, and held rigidly between brackets 64 and 66 for slidably supporting plate 74. Disc 42 is controlled by pucks 80 and 82, puck 80 being mounted on mechanically operated head 56 and movable axially therewith as the mechanical brake is applied, and puck 82 being mounted on support plate 84, which is slidable on sleeves 76 and 77. Adjustment mechanism 90 is disposed between plates 74 and 84 and determines the amount of travel required to actuate the brakes by hydraulic actuator 54 or mechanical head 56. Thus, when the hydraulic actuator is operated, the four pucks and the adjustment mechanism, which forms a spacer between the two plates, are moved laterally to the right, as viewed in FIG. 3, against head 56, which functions as an abutment when the hydraulic brake is applied. When the mechanical brake is applied, the four pucks and adjustment mechanism are moved to the left, and the hydraulic actuator functions as an abutment, thus permitting firm application of the pucks against the respective discs. When either the hydraulic or the mechanical brakes are applied, discs 40 and 42 likewise move axially on shafts 32 and 34, as permitted by the two splines 44 and 46.

Since wear occurs as the brake is used over a period of time, the adjustment mechanism 90 must be manipulated to compensate for the wear. The adjustment mechanism consists of a threaded hub 100 secured to plate 74 by a pair of screws 102 extending through puck 72 and plate 74 into threaded holes 104 in hub 100. A ring 106 having a threaded hole 108 for threadedly receiving hub 100 is mounted on hub 100 and is adjustable axially with respect to the hub to perform the adjustment operation between plates 74 and 84. In the embodiment illustrated in the drawings, the ring 106 is adjusted relative to the hub by a spanner wrench inserted in holes 110 in the periphery of ring 106.

In the operation of the present adjustable braking mechanism, with the brake in its inoperative position, discs 40 and 42 and shafts 32 and 34 are free to rotate without restraint or resistance from the hydraulic or mechanical actuators, and normally the four pucks, while they may be in light contact with the discs, do not restrain the rotation of the discs. The two motors drive the wheels independently of one another through their respective transmissions, and the two shafts 32 and 34 are driven, respectively, by motors 18 and 20. When the brakes are to be applied, the operator depresses the brake pedal, which actuates the hydraulic actuator, causing piston 73 to move to the right, as illustrated in FIG. 5, and press puck 70 against disc 40, which is in turn pressed against puck 72. Since puck 72 is supported by slidable plate 74, it urges adjustment mechanism 90 against slidable support plate 84, thus pressing puck 82 against disc 42 which in turn is pressed against puck 80 mounted on mechanical head 56 which serves as an abutment for the aforementioned elements, thereby applying an effective resistance to the rotation of both discs 40 and 42.

Since the discs are connected to shafts 32 and 34 by splines 44 and 46, and the two shafts are directly connected by the train of gears to hubs 14 and 16, the braking effect on discs 40 and 42 is immediately and positively transmitted to the wheels on the respective hubs. When the brakes are to be applied mechanically, the hand lever is operated, thus causing lever 58 to apply pressure on head 56 in the direction toward the two discs, thus compressing the four pucks against the two discs 40 and 42, with the piston 73 of actuator 54 functioning as an abutment, permitting the mechanical brake to apply effective braking pressure to the two discs. The restraint of the two discs by the mechanical brake is transmitted to the two wheels in the manner previously described with reference to the hydraulic actuation of the brake.

Since the brakes require adjustment from time to time to compensate for the wear occurring during operation, ring 106 is rotated to thread the ring to the right as illustrated in FIG. 5. The ring can readily be reached for adjustment by inserting a spanner wrench or other suitable tool between the two plates 74 and 84, without disassembling any part of the brake mechanism. An adjustment normally requires only a partial revolution of ring 106 on hub 100, and, while it may be locked in place by a set screw or other suitable locking device, this is normally not required in order to retain the desired adjustment made by the rotation of the ring.

It is thus seen that the brake mechanism is relatively simple in construction and operation, and an adjustment to compensate for wear during operation can be made conveniently from time to time by merely rotating ring 106, without disassembling any portion of the brake mechanism. Further, the brake mechanism can be easily serviced and parts replaced if required to repair the brake. While the brake mechanism has been described with a mechanically actuated mechanism, the brake adjustment mechanism is capable of being used satisfactorily with or without the mechanical braking device. In the event it is omitted, a rigid abutment is used to replace head 56 so that the pucks are urged into firm contact with the discs and the rigid abutment, by the piston 73 of hydraulic actuator 54. The adjustment mechanism 90 otherwise operates the same as previously described herein.

The present adjustable simultaneous braking mechanism will normally result in even braking between the wheels, notwithstanding the fact that they are independently driven, since braking does not occur until such time as both discs are in firm contact with their respective pucks. Since one adjustment necessarily affects both discs 40 and 42, and hence the wheels on hubs 14 and 16, the brakes constantly provide uniform braking between the wheels, regardless of the wear occurring on the pucks, or of the adjustments made to compensate for the wear. Because of the single brake mechanism located between the two hubs, with only one hydraulic actuator operating both brakes, the mechanism is inherently simple in construction and operation, and since fewer parts are required and the brake is located in a central position with respect to the two wheels, simplification of structure is possible and maintenance time is substantially reduced.

In a modified form of the adjustment mechanism of the present invention, a second hub similar to hub 100 is used, in which the second hub is threaded in the direction opposite to hub 100. The second hub is rigidly attached to slidable plate 84, and ring 106 is threaded for a right hand thread on one side and a left hand thread on the other side. When the adjustment mechanism is assembled with the opposite threads on the two hubs, rotation of ring 106 will adjust the plates laterally relative to one another and with the adjustment mechanism forms a solid connection between plates 74 and 84. With this arrangement, fine adjustment of the brake is possible, in that the rotation of the ring for the adjustment is not as critical for accuracy as it is with the single hub embodiment. However, the function of the hubs and ring in this adjustment mechanism is the same as in the previously described embodiment, and can be incorporated in the same type of brake mechanism without any substantial modifications required.

As described herein and as shown in the drawings, the hubs of discs 40 and 42 are splined to shafts 32 and 34, and the hubs move axially on the shafts to permit axial movement of the two discs relative to one another when the brake is operated. As an alternative, the hubs may or may not be movable axially on the shafts, and the relative movement of the disc is obtained by providing intermeshing serrations or teeth on the periphery of each hub and in a center opening in the respective discs, so that the discs will slide axially on the hubs, and hence move relative to one another, when with brake is operated. Operation of the brake system is otherwise the same as previously described herein.

While only one embodiment of the adjustable braking mechanism, and several modifications, have been described in detail herein, various further changes and modifications can be made without departing from the scope of the invention.

I claim:

1. A brake system for a vehicle having an axle housing, two independently driven wheels and two opposed shafts in alignment with one another and operatively connected to separate wheels: said system comprising a brake disc mounted on one of said opposed shafts, a second disc mounted on the other of said opposed shafts, said discs being movable axially relative to one another, a brake actuator disposed at one side of said first disc and rigidly connected to said housing, a puck disposed between said actuator and said first disc for engagement therewith, first and second support members slidably disposed between said discs and movable relative to one another, support means for said members, a puck on said first member for engagement with said first disc, a puck on said second member for engagement with said second disc, an abutment disposed on the side of said discs opposite said actuator, and an adjustment means disposed between said support members and having a threaded hub mounted on one of said members and a ring threadedly mounted on said hub and movable axially thereon and being operatively connected to both of said support members when said brake actuator is energized for varying the minimum spacing between said members to compensate for wear in said pucks resulting from actuating of the brakes.

2. A brake system for a vehicle having an axle housing, two independently driven wheels and two opposed shafts in alignment with one another as defined in claim 1, in which said discs are splined to the respective shafts for movement toward and away from one another during actuation of the brake.

3. A brake system for a vehicle having an axle housing, two independently driven wheels and two opposed shafts in alignment with one another as defined in claim 2, in which said first and second support members are of a plate-like construction with the surfaces thereof generally on a plane parallel to the plane of said discs, and said support means for said members consist of a pair of spaced rods on which said members are slidable.

4. A brake system for a vehicle having an axle housing, two independently driven wheels and two opposed shafts in alignment with one another as defined in claim 3, in which said hub is secured rigidly to said first member, and said ring abuts against said second member.

5. A brake system for a vehicle having an axle housing, two independently driven wheels and two opposed shafts in alignment with one another as defined in claim 4, in which said abutment is operated mechanically to move laterally with respect to said discs to apply a braking force against said discs, with the brake actuator forming an abutment while said mechanical brake is in operation.

6. A brake system for a vehicle having an axle housing, two independently driven wheels and two opposed shafts in alignment with one another as defined in claims 1 or 2, in which said abutment consists of a head of a mechanical brake and is movable laterally toward and away from said brake actuator as said mechanical brake is applied and released.

7. A brake system for a vehicle having an axle housing, two independently driven wheels and two opposed shafts in alignment with one another as defined in claims 1 or 2, in which said actuator is hydraulically operated and a piston of the actuator engages said first mentioned puck to move it laterally with respect to the discs and said other pucks toward said abutment.

8. A brake system for a vehicle having an axle housing, two independently driven wheels and two opposed shafts in alignment with one another as defined in claim 1, in which said first and second support members are of a plate-like construction with the surfaces thereof generally on a plane parallel to the plane of said discs, and said support means for said members consists of a pair of spaced rods on which said members are slidable.

* * * * *